United States Patent
Gammons et al.

(10) Patent No.: US 11,079,658 B2
(45) Date of Patent: Aug. 3, 2021

(54) LIGHTING SYSTEM AND CONTROL THEREOF

(71) Applicant: Rotolight Limited, Reading (GB)

(72) Inventors: Roderick Allen Gammons, Iver Heath (GB); Andrew Francis, Iver Heath (GB); Roderick Aaron Gammons, Iver Heath (GB)

(73) Assignee: Rotolight Limited, Iver Heath (GB)

( * ) Notice: Subject to any disclaimer, the term of this patent is extended or adjusted under 35 U.S.C. 154(b) by 0 days.

(21) Appl. No.: 16/813,750

(22) Filed: Mar. 10, 2020

(65) Prior Publication Data
US 2020/0209716 A1  Jul. 2, 2020

Related U.S. Application Data

(63) Continuation of application No. 15/485,239, filed on Apr. 12, 2017, now Pat. No. 10,606,150.

(30) Foreign Application Priority Data

Apr. 15, 2016 (GB) .................................. 1606658
Apr. 10, 2017 (GB) .................................. 1705754

(51) Int. Cl.
*G03B 15/05* (2021.01)
*G03B 15/04* (2021.01)
(Continued)

(52) U.S. Cl.
CPC ............. *G03B 15/05* (2013.01); *G03B 15/04* (2013.01); *H04N 5/2256* (2013.01); *H05B 41/325* (2013.01); *G03B 2215/05* (2013.01)

(58) Field of Classification Search
CPC .............................. G03B 15/04; G03B 15/05
See application file for complete search history.

(56) References Cited

U.S. PATENT DOCUMENTS

2002/0025157 A1  2/2002  Iwakami
2007/0189754 A1  8/2007  Iwasaki
(Continued)

FOREIGN PATENT DOCUMENTS

CN   104301475   1/2015
GB   2482562    2/2012
(Continued)

OTHER PUBLICATIONS

Communication Pursuant to Article 94(3) EPC dated Sep. 18, 2019 From the European Patent Office Re. Application No. 17166340.4. (7 Pages).
(Continued)

*Primary Examiner* — Clayton E. LaBalle
*Assistant Examiner* — Dennis Hancock

(57) ABSTRACT

The present invention relates to a lighting control device, the device comprising means for receiving a trigger; and means for switching operation of a lighting device from a continuous mode to a flash mode upon receipt of said trigger; wherein said lighting device comprises at least one light emitting diode; and said flash mode is at a higher brightness than said continuous mode. The invention also relates to a lighting system comprising: a lighting device comprising at least one light emitting diode; and a lighting control device; wherein the lighting control device is operable to switch operation of said lighting device between a continuous mode and a flash mode; wherein the flash is at a higher brightness than said continuous mode.

19 Claims, 4 Drawing Sheets

(51) Int. Cl.
  *H04N 5/225* (2006.01)
  *H05B 41/32* (2006.01)

(56) References Cited

U.S. PATENT DOCUMENTS

| | | | |
|---|---|---|---|
| 2008/0009316 A1 | 1/2008 | Yamashita | |
| 2008/0116814 A1 | 5/2008 | Heffelfinger et al. | |
| 2012/0127361 A1* | 5/2012 | Clark | G03B 15/05 348/371 |
| 2012/0243859 A1* | 9/2012 | Clark | G03B 9/70 396/180 |
| 2012/0330684 A1* | 12/2012 | Jacobs | H04N 7/18 705/3 |
| 2013/0076890 A1 | 3/2013 | Bovee | |
| 2014/0139133 A1 | 5/2014 | Kawasaki | |
| 2015/0124427 A1* | 5/2015 | Clark | H05B 41/14 362/11 |
| 2017/0102116 A1 | 4/2017 | Sherry et al. | |
| 2017/0311428 A1* | 10/2017 | Falk | H05B 41/30 |

FOREIGN PATENT DOCUMENTS

| | | |
|---|---|---|
| JP | 2005-130111 | 5/2005 |
| WO | WO 2008/036978 | 3/2008 |
| WO | WO 2011/103518 | 8/2011 |

OTHER PUBLICATIONS

Communication Pursuant to Rule 114(2) EPC dated Jul. 8, 2019 From the European Patent Office Re. Application No. 17166340.4. (68 Pages).
Examination Report under Section 18(3) dated Jul. 18, 2019 From the Intellectual Property Office fo the United Kingdom of Great Britain Re. Application No. 1705754.8. (5 Pages).
Official Action dated Jun. 1, 2018 From the US Patent and Trademark Office Re. U.S. Appl. No. 15/485,239. (19 pages).
Official Action dated Jun. 11, 2019 From the US Patent and Trademark Office Re. U.S. Appl. No. 15/485,239. (18 Pages).
Official Action dated Nov. 29, 2018 From the US Patent and Trademark Office Re. U.S. Appl. No. 15/485,239. (17 pages).
Patents Act 1977: Combined Search and Examination Report Under Sections 17 and 18(3) dated Jul. 25, 2017 From the Intellectual Property Office of the United Kingdom of Great Britain Re. Application No. GB1705754.8. (5 Pages).
Supplementary European Search Report and the European Search Opinion dated Jun. 7, 2017 From the European Patent Office Re. Application No. 17166340.4. (7 Pages).
Advanced Illumination "DCS Series Lighting Controller—User Manual", Advanced Illumination: 1-24, Nov. 7, 2016.
Duxbury "Over-drawing LEDs for brightness", Brian Duxbury's Blog, Retrieved from bryanduxbury.com, Published on Dec. 2, 2013.
Fuzhou F&V Photographic Equipment "Z-Fiash Utility Video Light User Guide", 9 P., 2012.
Gardasoft "The Practical Use of LED Light Controllers Within Machine Vision Systems", LED Light Controllers—Technology Overview: 1-13, XP055606944, 2015.
Litepanel "Advanced Led Lighting for Video, Still Photo & Motion Picture Production", Catalogue, p. 1-16, Jan. 8, 2010.

\* cited by examiner

LIGHTING SYSTEM AND CONTROL THEREOF

RELATED APPLICATIONS

This application is a Continuation of U.S. patent application Ser. No. 15/485,239 filed Apr. 12, 2017, which claims the benefit of priority of United Kingdom Patent Application Nos. 1606658.1 filed on Apr. 15, 2016 and 1705754.8 filed Apr. 10, 2017. The contents of the above applications are incorporated herein by reference in their entirety.

FIELD AND BACKGROUND OF THE INVENTION

This invention relates to a lighting device and control thereof; in particular to a lighting device operable to produce a flash.

In the photographic industry, dedicated on and off-camera flash units are used to illuminate scenes for a fraction of a second to allow a camera to obtain a good photographic image in poor light conditions. These flash units are typically triggered to coincide with the camera shutter by an electrical signal from the camera itself. Studio lights differ from flash lights in that they provide a continuous level of illumination which allows the user to "shoot what they see" taking out the guess work and 'trial and error' process associated with flash. Additionally this means continuous light can be used for both photography and video. However they are typically unable to match the instantaneous light levels of a dedicated flash unit, since to do so would require excessive cost and power.

Modern flash/strobe units sometimes include "modelling lights" consisting of an additional light source in addition to the flash light source. The purpose of such additional lights is to compose the image and pose the 'model' so the photographer can judge where shadows and highlights will fall in advance of the flash. From a human physiology point of view, this is an easier process for a subject to endure, as high power continuous lighting can be uncomfortable and sometimes carries a health risk to the subject. Such an arrangement also allows the camera to autofocus, and enables the model to pose and prepare for the flash and control pupil dilation without over reacting to the brightness of the flash.

However, the use of a second light source independent of the primary strobe or flash may affect the outcome of the photograph as they necessarily use a different bulb from the main flash unit at a lower intensity and varying correlated colour temperature (CCT), often with lower colour rendering index (CRI) accuracy—this throws off the skin tone, and renders inaccurate light readings taken before the flash is fired. It also limits the usefulness of any approximation of shadow and highlights perceived which, due to the positioning and light characteristic differences of the modelling light, will noticeably vary from the primary strobe/flash unit.

An improved solution is desired.

SUMMARY OF THE INVENTION

Broadly, according to one aspect of the present invention, there is provided a lighting device or lighting system adapted to provide continuous lighting with built in, user controllable, flash capability. Preferably, the lighting device comprises light emitting diodes adapted to allow changing colour temperature. More preferably, the lighting device is powered via its own built in (battery) power source.

Broadly, there is provided a light with colour temperature adjustable flash.

According to another aspect of the present invention there is provided a lighting control device, the device comprising: means for receiving (for example in the form of a processor and associated memory) a trigger; and means for switching operation (for example, in the form of switching circuitry) of a lighting device from a continuous mode to a flash mode upon receipt of said trigger, wherein said lighting device comprises at least one light emitting diode; and said flash mode is at a higher brightness than said continuous mode.

According to another aspect of the present invention there is provided a lighting system comprising: a lighting device; and a lighting control device; wherein the lighting control device is operable to switch operation of said lighting device between a continuous mode and a flash mode, wherein said lighting device comprises at least one light emitting diode; and said flash mode is at a higher brightness than said continuous mode.

Preferably the lighting control device in the lighting system is a lighting control device as described herein.

According to another aspect of the present invention there is provided a method of controlling a lighting device comprising at least one light emitting diode, the method comprising: powering a lighting device in a continuous mode; receiving a trigger; powering said lighting device so as to emit a flash upon receipt of said trigger, wherein the flash is at a higher brightness than said continuous mode.

Preferably, the lighting device or lighting system containing built in flash capability is an LED lighting fixture. Such a lighting device or lighting system provides an energy efficiency saving compared to incandescent, halogen or florescent lighting devices.

Preferably the lighting device or lighting system containing built in flash capability is operable to run off an internal power source, such as V Lock Broadcast battery. In such a way, the lighting device or lighting system has enhanced portability and increased utility for location shooting.

Preferably, the lighting device or lighting system comprises a flash sync 3.5 mm jack input to enable the LED light to be used as a "strobe/flash" via a standard PC or 'hotshoe' flash sync connector.

Preferably, start/stop "triggering" of the flash can be controlled locally via a user interface on the lighting device or lighting system itself, remotely via WiFi™, Bluetooth™, Zigbee™ or wireless DMX from a smart phone or tablet, or from a wired 3.5 mm minijack remote trigger, or a wired DMX trigger.

Preferably, the sync connection is universal enabling flash synchronisation including any standard Canon™/Nikon™/third party device, including opto slave coupler, and can be also operated as a wireless slave Flash with any standard wireless slave remote trigger system (e.g. Pocket Wizard™, Photix™ etc).

Preferably, the flash Sync port may also enable wired push button trigger or remote wireless trigger, to trigger certain lighting effect simulations. This allows remote control of lighting effects when the lighting device or lighting system is in an inaccessible location, such as mounted on a ceiling truss.

Preferably, the flash is controlled by a control panel on the back of the lighting device or lighting system itself—comprising buttons, rotary knobs and a display of the effect parameter, or via a serial communications interface (e.g. RS232, USB or DMX) from a computer running custom lighting control software.

Preferably, the flash can be remote controlled via Wi-Fi from a smart phone or tablet running a suitable custom lighting control app.

Preferably the flash trigger may be provided by an detected electrical signal connected via a standard 3.5 mm mono mini jack such as a wired remote trigger switch, camera shutter release or 'PC' connector, or a camera shutter release trigger signal direct from the camera ISO 518 hot-shoe, or A wireless signal relayed from the camera by a commercial wireless transmitter/receiver trigger kit such as the Pocket Wizard® PlusX., or an optical slave trigger—so that the flash can be remotely triggered by detecting the light from another flash.

Preferably, the parameters of the flash (including but not limited to, flash duration, delay, colour and brightness) are customisable locally on the light itself, or remotely via Wifi or Bluetooth.

Preferably, the lighting device with built in flash is operable to generate both continuous illumination for 'modelling' and a short pulse of very bright light suitable for flash photography.

Preferably the lighting device with built in flash capability uses its primary light source as both the flash and modelling light source, to enable accurate preview of shadow and highlight characteristics of the light source prior to the photograph being taken.

Preferably, the lighting device with built in flash capability is adapted to produce a short burst of light up to 4 times brighter than its maximum continuous output level, without damaging the LEDs within the lighting device.

Preferably, the lighting device with built in flash capability has minimal to zero re-cycle or recharge time to enable high frame rate photography. In one example, this is provided by the lighting device comprising LEDs.

Preferably, the lighting device comprises multiple LEDs arranged over a much larger area than a typical flash bulb, which provides a more spread and diffused 'soft-light' source that will be perceived as looking very similar to natural light (i.e. a larger luminaire light source).

Optionally, the means for receiving a trigger comprises a connection to a camera. Optionally, the means for receiving a trigger comprises a wireless receiver. Optionally, the means for receiving a trigger comprises an optical sensor adapted to detect a flash.

Preferably, the lighting device further comprises means for receiving user input. Optionally, wherein said means for receiving user input comprises a wireless receiver adapted to receive input from a mobile device. Optionally, said means for receiving user input comprises a user interface.

Preferably, the lighting device further comprises means for adjusting the colour of the light of said continuous mode and/or said flash mode.

Preferably, the lighting device further comprises means for throttling the power to said lighting device in said continuous mode. Preferably, the means for throttling the power comprises means for modulating the power. Preferably, said means for modulating comprises means for pulse width modulation. Preferably, said modulation is current-mode modulation.

Preferably, the means for switching operation (for example in the form of switching circuitry) is adapted to switch to said flash mode for substantially the duration that a camera's shutter is open.

Preferably, the appropriate flash duration is determined in dependence on the time elapsed since a previous flash trigger was received. In such a way, the lighting element can be protected from damage from multiple overlapping flashes in quick succession.

Preferably, the means for switching operation (for example in the form of switching circuitry) is adapted to switch to said flash mode for substantially the duration that a camera's shutter is open. This is particularly beneficial for fast shutter speeds where otherwise portions of the frame may not be properly exposed Preferably, the lighting system is for flash photography.

Preferably, the lighting system further comprises means for receiving user input, preferably via a user interface.

Preferably, the lighting system further comprises means for adjusting the colour of the light of said continuous mode and/or said flash mode.

Preferably, the lighting system further comprises means for adjusting the duration and/or power of said flash mode.

Preferably, said flash mode is a higher power mode than said continuous mode. Optionally said flash mode is 100% to 1,000%, 200% to 400%, or 300% to 400% of the power of the continuous mode.

Preferably, said continuous power mode and said flash mode use the same light emitting element.

Preferably, said at least one light emitting diode comprises light emitting diodes of differing colours.

Preferably, the lighting system further comprises a power supply. Preferably, said power source comprises a battery.

Preferably, the step of powering a lighting device in a continuous mode comprises throttling the power so as to dim the lighting device. Preferably, throttling comprises modulating the power to the lighting device. Preferably, the modulating comprises pulse width modulation. Preferably, said modulation is current-mode modulation.

Preferably, the step of powering said lighting device so as to emit a flash comprises reducing said throttling.

Preferably, the step of receiving a trigger comprises receiving a trigger from a camera. Optionally, the step of receiving a trigger comprises wirelessly receiving a trigger. Optionally, the step of for receiving a trigger comprises detecting a flash.

Preferably, the flash has a duration of between 1 ms and 100 ms, optionally a duration of between 1 ms and 50 ms.

The method may further comprise delaying the emission of said flash following receipt of a trigger. Optionally the delay is between 1 ms and 999 ms.

The method may further comprise the step of returning to said continuous mode following said flash.

The invention extends to any novel aspects or features described and/or illustrated herein.

Further features of the invention are characterised by the other independent and dependent claims Any feature in one aspect of the invention may be applied to other aspects of the invention, in any appropriate combination. In particular, method aspects may be applied to apparatus aspects, and vice versa.

Furthermore, features implemented in hardware may be implemented in software, and vice versa. Any reference to software and hardware features herein should be construed accordingly.

Any apparatus feature as described herein may also be provided as a method feature, and vice versa. As used herein, means plus function features may be expressed alternatively in terms of their corresponding structure, such as a suitably programmed processor and associated memory.

It should also be appreciated that particular combinations of the various features described and defined in any aspects of the invention can be implemented and/or supplied and/or used independently.

The invention also provides a computer program and a computer program product comprising software code adapted, when executed on a data processing apparatus, to perform any of the methods described herein, including any or all of their component steps.

The invention also provides a computer program and a computer program product comprising software code which, when executed on a data processing apparatus, comprises any of the apparatus features described herein.

The invention also provides a computer program and a computer program product having an operating system which supports a computer program for carrying out any of the methods described herein and/or for embodying any of the apparatus features described herein.

The invention also provides a computer readable medium having stored thereon the computer program as aforesaid.

The invention also provides a signal carrying the computer program as aforesaid, and a method of transmitting such a signal.

The invention extends to methods and/or apparatus substantially as herein described with reference to the accompanying drawings.

BRIEF DESCRIPTION OF THE SEVERAL VIEWS OF THE DRAWINGS

The invention will now be described by way of example, with references to the accompanying drawings in which.

DESCRIPTION OF SPECIFIC EMBODIMENTS OF THE INVENTION

Figure 1:
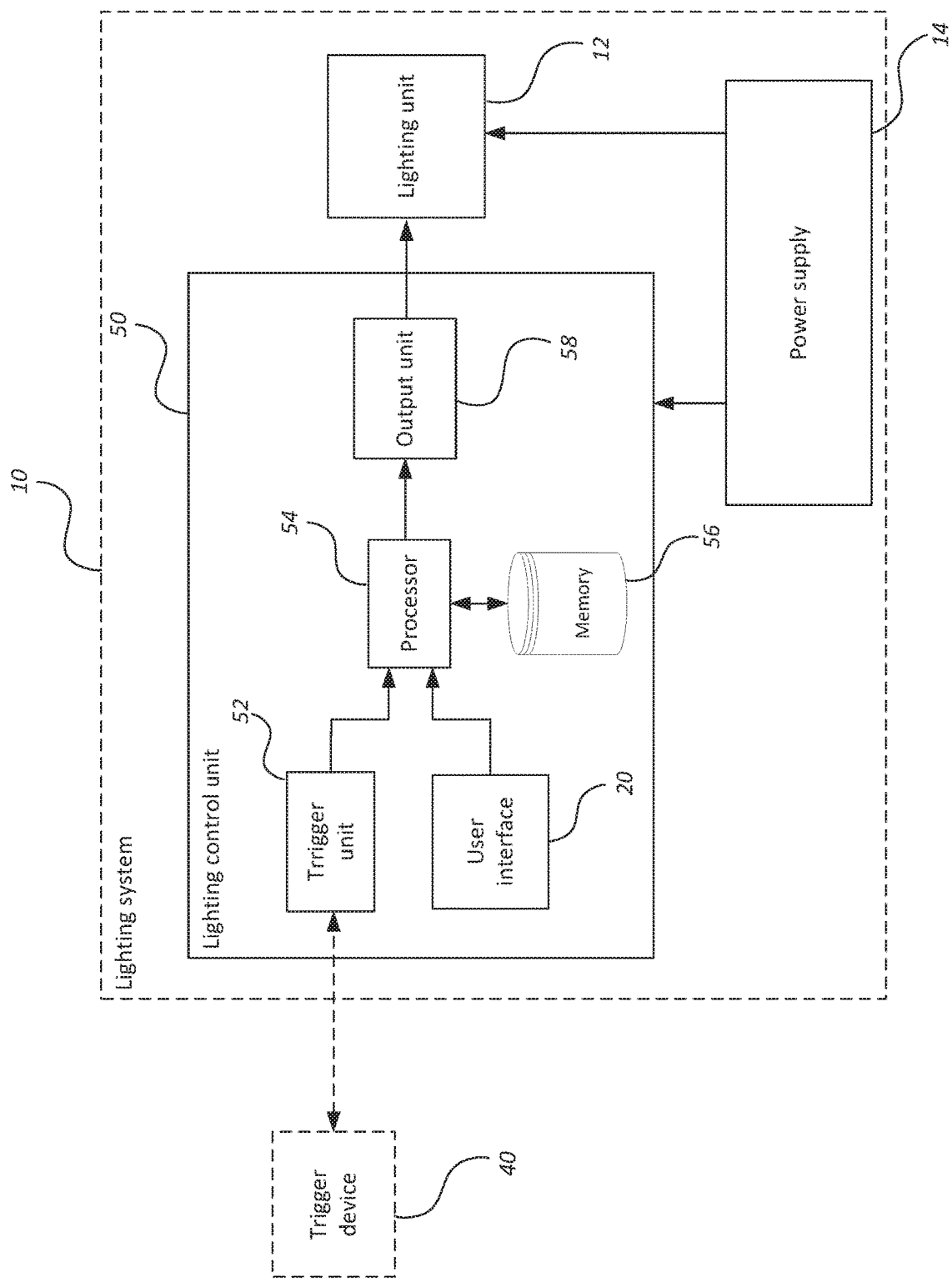
FIG. 1 shows a schematic diagram of a lighting system.

In the description below, the terms 'flash' and 'strobe' may be understood to mean a sudden burst of light intended to illuminate an object for photography. Such 'flashes' are typically between 1 ms and 100 ms, but may be shorter or longer depending on the specific circumstances.

In overview, the present invention provides a continuous light with built-in flash functionality; a light with built-in flash capability able to generate both continuous illumination for 'modelling' and a short pulse of very bright light suitable for flash photography. The continuous 'modelling' light and the 'flash' light are produced by the same light emitting elements. This ensures that the continuous light and the flash have uniform colour and shadow properties.

The continuous light, and the flash light, are controllable—in terms of brightness (illuminance) and colour temperature (Kelvin). In such a way, the lighting device that is capable of both operating as a continuous light and as a flash (with a higher power output), in which both modes have a fully user customisable colour temperature range (Kelvin), to enable photographs to be taken to match accurately the ambient lighting conditions, and so as to determine accurate white balance.

This is achieved by using an LED light that can increase the supply current to the LED beyond the nominal operating current for short periods of time in order to produce a higher light output or 'flash', whilst preventing damage to the LED that would otherwise occur from exceeding the nominal operating current of the LED.

Such a device acts as a bridge between legacy flash/strobe devices and continuous light devices, providing the benefits of both technologies whilst reducing or eliminating the typical drawbacks when separate devices are used. This means that a studio or production company undertaking photography and/or video would not need to purchase and set up two separate devices each of which with their own drawbacks; the present invention alleviates problems associated with either type of device, and speeds up workflow. The present system therefore provides continuous, controllable 'modelling' light for setup, posing and image composition for both video, cinematographic and photographic applications, and a bright triggerable flash to provide an extra level of illumination needed to bring out details in the scene to be photographed.

The present invention uses only one light source (e.g. an LED Matrix) for both the primary flash and the modelling light (as opposed to two independent lights), and in so doing providing a high quality modelling light with identical characteristics to the "primary" flash light. In particular, the colour temperature and shadowing characteristic provided by the flash is essentially identical to that of the constant light in which the camera was set up. This affords accurate and predictable results rather than relying on 'trial and error'. This provides the ability to use the light for both video and photography as a continuous light source, but also serving as a dedicated strobe flash light source with a large surface area of luminaire, and provides a softer, less harsh shadowing than traditional flash units.

FIG. 1 shows a schematic diagram of a lighting system 10. The system comprises a lighting control unit 50, a lighting device 12, and a power supply 14. In one example, the lighting control unit 50 is part of the lighting device 12, for example, being placed on the reverse of the lighting device 12. The power supply 14 may take the form of a battery pack within the lighting system 50, or within the lighting device 12. Alternatively, the power supply 14 may be an external power source such as mains power, or a generator.

In use, the lighting control unit 50 controls the lighting device 12 to either be powered so as to provide continuous lighting, or so as to provide a flash. The user enables a 'wait for trigger mode' whereby the lighting control unit 50 primes the lighting device 12 to be able to provide a flash upon receipt of a trigger.

The lighting device 12 in one example comprises an array of light emitting elements such as LEDs, potentially consisting of multiple colours. The array may be a panel, flood light, a cluster or any other arrangement of LEDs. This provides the ability for the lighting to produce light of a desired brightness and colour by varying the relative intensities of the different LEDs. The lighting device 12 may alternatively be a filament (incandescent), halogen or other type of lighting.

LEDs have particular advantages over other forms of light source, as they do not have a recycle/recharge time. Having an effectively instantaneous recycle time allows photographers to work at any frame rate without limitations on flash/frames per second. LEDs can be powered by relatively low power sources (such as a battery pack) eliminating the need for external power units. LEDs are more reliable than bulbs typically used for flashes and do not stress the light emitting element as strenuously and as such can achieve a lifespan in excess of 100× greater than incandescent or fluorescent (e.g. Xenon) bulbs (i.e. in excess of 100,000-500,000 flashes).

As the flash typically lasts for less than 50 ms, the lighting device 12 is able to switch into a high-current, high-power 'flash' mode (producing multiples of the maximum 100% continuous light output—anywhere from 0.4 to 5 times more than 100% maximum brightness) just for the duration of the flash, and then return to normal current and power levels. In this way it is possible to exceed the normal limits on continuous power and current without damaging the light elements and without requiring a more powerful power supply 14. The means for switching between continuous and flash modes may comprise switching circuitry—for example circuitry comprising a semiconductor switch, or a relay.

The lighting control unit 50 comprises a user interface 20, a trigger unit, an output unit 58, and a processor 54 and associated memory 56. The user interface 20 enables a user to adjust settings and enable/disable the flash and/or continuous light.

The user adjustable parameters include but are not limited to the following:

Flash Brightness: The peak luminance of the flash e.g. from 40% to 1,000%, or from 100% to 500%, from 200% to 400%, or 300% to 400% of the normal continuous luminance output. In one example, the flash is required to be brighter than the setting for the continuous 'modelling light'.

Modelling Light: The continuous lamp luminance generated when the flash is not being triggered (from 0% to 100% of normal lamp brightness).

Flash Colour: Sets the colour temperature of the flash, typically with an adjustable range from 2800K to 6500K. The colour temperature of the flash can be precisely controlled and calibrated by adjusting the balance between the individual elements (e.g. LEDs) that make up the lamp. In one example, adjusting the colour of the modelling light adjusts the colour of the flash light and vice versa. Adjusting the colour of a Xenon flash device is not possible.

Flash Duration: Typically from 1 ms to 100 ms, or 1 ms to 50 ms, or 0.1 ms to 50 ms (shorter flashes may be required for photographing fast-moving objects). Since LEDs have a very fast turn-on and turn-off time, it is possible to control the length of illumination very precisely. This can be useful for capturing moving objects. The duration (and indeed the time-dependent profile of the flash) can be controlled accurately. The flash duration may be set in dependence on the shutter speed of the camera being used; a user may therefore input the shutter speed and the control unit 50 adjust the flash duration accordingly (i.e. so the entire shutter open period is illuminated).

Flash Delay: Typically 0 ms to 999 ms. This sets the delay from the flash trigger signal to the start of the flash light pulse output. This enables the flash to be used in 'Flash Curtain' mode where the camera shutter opens before the flash is enabled (rear curtain), enabling a use to create creative photographic effects. The flash delay, flash duration, trigger-to-photo delay, and camera shutter speed can be adjusted to create other photographic effects, for example where the shutter stays open after the flash stops. Other flash effects, such as red-eye reduction, may be enabled.

The user interface 20 may take the form of a screen and buttons and/or knobs on the lighting device 12 itself enabling a user to adjust the above settings. Alternatively or in addition, a user may adjust the settings via a separate device (such as a smartphone or tablet in conjunction with a suitable application, or via a serial communications interface (e.g. RS232, USB or DMX) from a computer running suitable lighting control software) and the settings are transmitted to the lighting control unit 50. Such a feature is particularly useful when the light is situated in an inaccessible area, such as suspended above a subject to be illuminated. Thus, the parameters of the flash can be controlled remotely via WiFi™ or DMX from a smart phone, tablet, computer or lighting controller.

The brightness, duration, and colour values generated by the Flash Control Logic are then passed to the output unit 58 where they are translated into the appropriate format for input to the lighting device 12 drive circuit. This may involve the processor sending data which defines the current control output for each LED colour.

The trigger unit 52 is adapted to receive a trigger, which may be from an external trigger device 40. The trigger may be provided by any of the following:

A detected electrical signal connected via a standard 3.5 mm mono mini jack such as a wired remote trigger switch, camera shutter release or 'PC' connector.

A camera shutter release trigger signal direct from the camera ISO 518 hot-shoe.

A wireless signal relayed from the camera by a wireless transmitter/receiver trigger kit such as the PlusX™ radio transmitter/receiver marketed by PocketWizard®, or a wireless transmitter/receiver trigger kit marketed by Phottix™.

An optical slave trigger—so that the flash can be remotely triggered by detecting the light from another flash.

In each case, the trigger unit 52 comprises means for receiving a trigger signal, for example in the form of a wireless receiver or a light sensor (with a suitably programmed processor and associated memory). The synchronisation between a camera and the lighting system 12 is universal enabling flash synchronisation including any standard Canon®/Nikon®/third party device, including opto (optocoupler) slave couplers.

Figure 2:
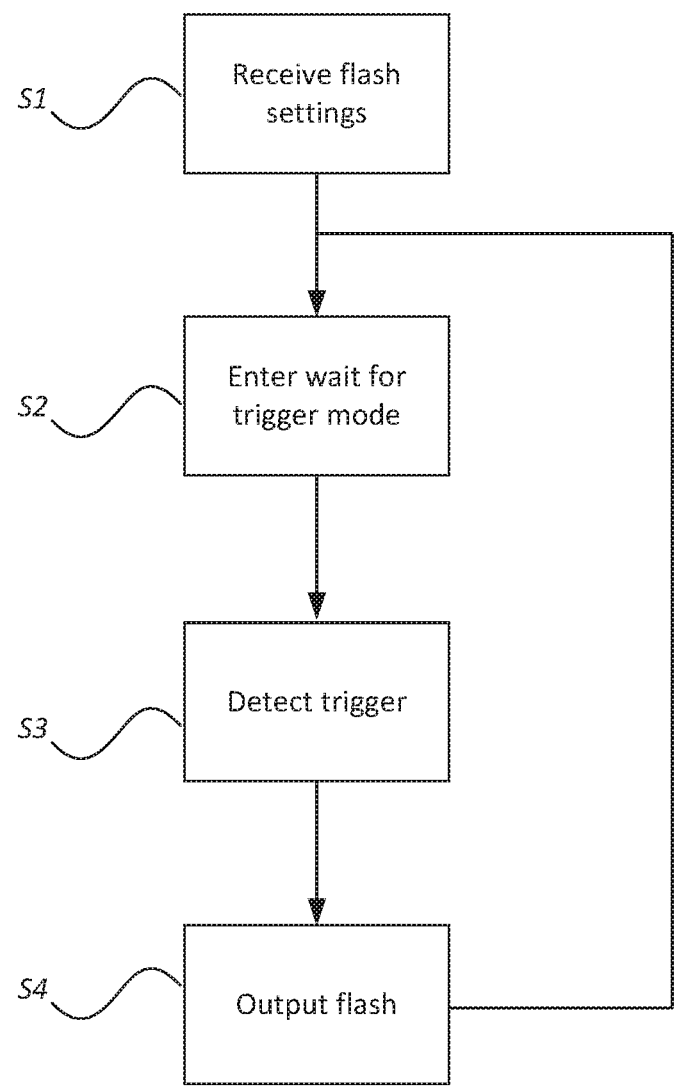
FIG. 2 shows a flow diagram for controlling a lighting system

FIG. 2 shows a flow diagram for controlling the lighting system 10. The first step S1 is for the lighting control unit 50 to receive the flash settings. The user then instructs the system to enter a 'wait for trigger mode' in step S2. In this mode, the lighting device 12 is primed so as to be ready to produce a flash. In this mode the current (or voltage) to the lighting device 12 is ramped up to the required level to generate the flash while the continuous light output is throttled at a constant level to dim the lighting device 12 to compensate for the increased peak current (or voltage).

A trigger is then detected at step S3, the lighting control unit 50 then waits for the specified delay period then outputs a flash in step S4. The system then returns to the 'wait for trigger' mode in step S2.

The user can exit the primed 'wait-for-trigger' mode by pressing a button on the lighting device (or via a wireless device). This sets the lighting device 12 current back to its normal value and puts the lighting device 12 back into normal continuous operation mode.

The 'priming' of the lighting device 12 in the 'wait for trigger' mode in one example involves increasing the power supplied to the device by throttling the transmission of the power to the lighting device 12 so that the output of the light is the relatively low-level 'continuous' light. When a trigger is detected, this throttling is reduced or removed for a short duration so that a higher power is transmitted to the lighting device 12 to emit a 'flash'. The power supply 14 of lighting system 10 may comprise overload compensation circuitry so that short increases in current draw (during the 'flash') do not damage the components of the system 10.

The power throttling may take the form of modulating the power supplied to the lighting device 12, controlled by the processor 54 and associated memory 56 controlling a modulation circuit in the output unit 58. In one example, the modulation is in the form of pulse width modulation. Modulation reduces the losses that compared to throttling the power by way of resistive means (for example) as the resistive losses in modulation only occur during the transition state of the switch used, which is negligible when using semiconductor switches such as metal oxide field-effect transistors (MOSFETs) or insulated-gate bipolar transistors IGBTs. Furthermore, analogue dimming of LEDs by resistive means may alter the colour characteristics, meaning that the flash may be a slightly different colour to the continuous 'modelling light'.

Modulation is well-suited to providing a very short pulse as switching by way of semiconductor switches can accurately produce a 'pulse' of increased power with a controllable delay for a controllable period, for example so that a user can adjust the delay and/or duration of the flash in the order of milliseconds.

The modulation results in the current and/or the voltage supplied to the lighting device 12 being lowered (stepped-down) when in continuous mode. If the lighting device 12 comprises LEDs, flickering may occur if the voltage is lowered below an activation voltage, so it may be preferable to control the current. A current-mode controlled pulse width modulation circuit may be utilised to control the current supplied to the lighting source 12. Such circuitry may be more complex than voltage-mode controlled pulse with modulation circuitry, but effectively eliminates 'flickering', and simplifies load sharing.

Alternatively a voltage-mode controlled modulation circuit may be used to control the voltage supplied to the lighting source 12. If this produces flickering at a frequency above human perception (e.g. above 200 Hz), and/or at a frequency above the frame rate/shutter speed of a camera recording the scene, it can be accepted.

Example of suitable modulation circuitry include: triode for alternating current (TRIAC) diode (also referred to as a bidirectional triode thyristor), or a Buck converter, under the control of a clock output from processor 54. In either current- or voltage-mode control, components to rectify an AC signal to DC may be incorporated as necessary.

If the light senses a second trigger within a specified flash duration, triggering a second flash may damage the LED element by keeping it on at a higher output level that would be optimal. Thus, if a second flash trigger is received (i.e. asking the unit to fire) so as to result in overlapping flashes, the lighting device automatically truncates the flash duration to still provide the user with a usable flash, but at the same time preventing damage to the LED lighting element that would otherwise occur. This feature is termed 'Adaptive input monitoring' (A.I.M).

The appropriate duration of a second flash is thus determined in dependence on the time elapsed since a previous flash trigger was received—generally, the closer the two flashes are together, the shorter the duration the second flash will be so as to protect the lighting element.

A further feature of the lighting control system is the ability to provide a continuous LED light that is also able to flash at a shutter speed faster than the native internal sync speed of a camera.

When using a shutter speed, faster than the cameras native internal sync speed (which typically is anything faster than $\frac{1}{250}^{th}$ of a second), many cameras cannot open and close the shutter quickly enough in sync with the flash. The maximum shutter speed to which the camera is able to synchronise to the flash is termed the 'camera's native sync' ($t_{ns}$). To overcome this inherent maximum shutter speed, many cameras artificially increase the shutter speed by closing the rear curtain before the front curtain has opened all the way. This is shown in the upper parts of FIGS. 3(a) and (b) where the front curtain 300 opens, then the rear curtain 302 starts closing before the front curtain 300 has opened all the way.

Typical flash guns have the problem that the duration of the flash is very short and as such when using a very fast shutter speed a portion of the frame may not be lit (or appearing to have a band of unlit frame). This is particularly problematic when you require faster shutter speeds to effectively capture the action, or for other aesthetic reasons (like requiring a wide aperture).

Figure 3A:
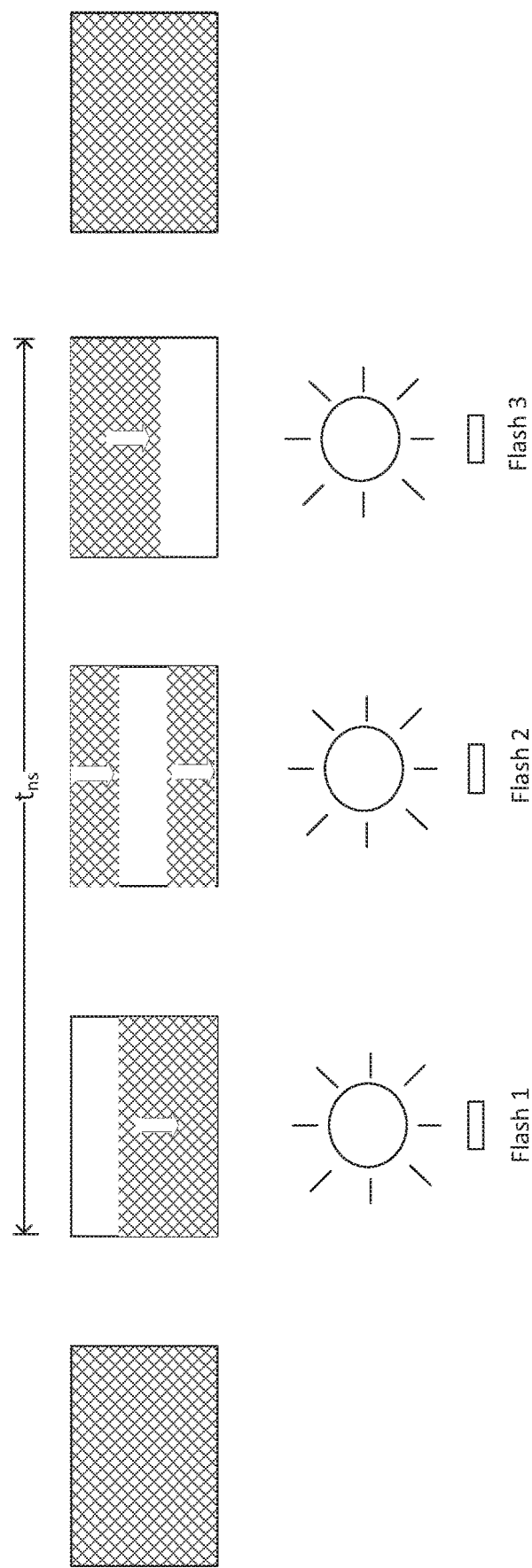
FIG. 3(a) shows a flash process for fast shutter speeds.

To mitigate this problem some camera flash units burst at multiple times throughout the camera's shutter open period. This process is termed 'High-speed sync flash' and is shown in FIG. 3(a). However, this approach still may not evenly expose the entire frame.

One major drawback to 'high speed sync' is that of gradual flash power loss when working in higher shutter speeds. As the shutter speed increases, flash power is lost. This is due to the flash changing its flash duration. The flash is required to extend its effective flash duration by pulsing light over the entire sensor area. In normal flash operation, both shutter curtains are completely open for a millisecond exposing the entire sensor at once. At normal sync speeds below $\frac{1}{250}$, a flash only has to fire once to cover the entire sensor.

Figure 3B:
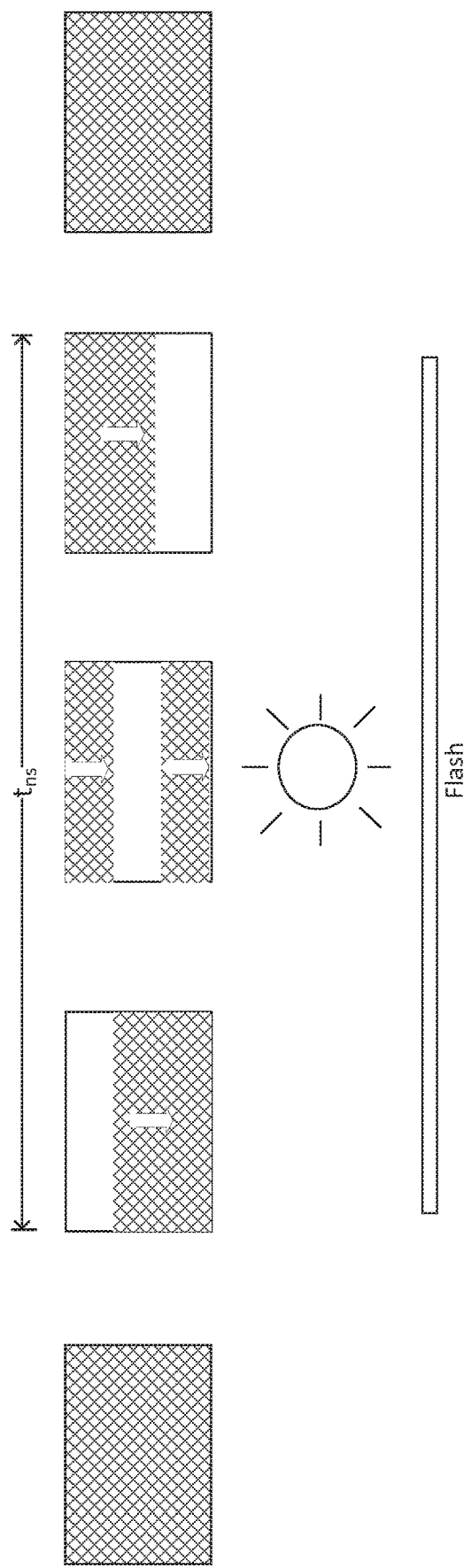
FIG. 3(b) shows an alternative 'fast continuous sync' process to the process shown in FIG. 3(a).

In contrast the apparatus described herein is adapted to provide a continuous burst of LED light that at a shutter speed faster than the native internal sync speed of a camera—substantially for the duration that the camera's shutter is open—as shown in FIG. 3(b). In such a way a shutter-synchronised flash is provided that is a brighter continuous light during the entire period the camera shutter is open, effectively enabling a flash at a shutter speed that is faster than the native internal sync speed of the camera. This approach is particularly well suited to LED lighting where a constant, controllable light output can be produced—which is not possible when using halogen flash units.

In such a way a continuous flash event—a flash that lasts across the entire duration of the shutter that creates a front to back exposed shot—is created. Previous 'high speed sync' processes emit a series of tiny small flash events at lower power than is achievable with one longer, more powerful flash event.

Typical flash/strobe units work by storing energy into a capacitor, which is then released as one major flash burst. A recycle time is then required to recharge that capacitor in order to provide another burst. This results in critical moments where the flash simply does not fire resulting in under exposed photographs, or completely unusable results. In situations such as weddings photography, that perfect moment may be lost forever whilst waiting for the flash to recharge.

Modern cameras can now shoot at multiple frames per second and the present system is able to respond to the needs of those modern cameras. Existing cameras which rely on capacitors cannot enable a photographer to take advantage of a camera's ability to shoot multiple frames per second whilst using flash.

In contrast, the present system provides a continuous LED light that can also flash. The LEDs have the advantage that they do not have to store energy in capacitor releasing it in one major event.

Typically LED systems would run at 20 mA nominal current to avoid damage to LEDs that can be caused by running at higher currents. The system described herein enables the LEDs to run at multiples over than 20 mA (e.g. 4 or 5×) i.e. up to 100 mA to produce a 'burst' or flash of light, resulting in a light output significantly greater that the normally derived light output, whilst at the same time avoiding damage that would typically occur by running an LED over its nominal operating current (which refers to continuous current provided to the LED).

ALTERNATIVES AND MODIFICATIONS

Various other modifications will be apparent to those skilled in the art for example multiple lighting devices 12 may be coupled together, but only a sub-set of them may flash when a trigger is received.

Whilst there are advantages associated with a flash being of the same colour profile as the continuous 'modelling' light, special effects may be produced by having a flash of a different colour to the modelling light.

It will be understood that the present invention has been described above purely by way of example, and modifications of detail can be made within the scope of the invention.

Reference numerals appearing in the claims are by way of illustration only and shall have no limiting effect on the scope of the claims.

What is claimed is:

1. A method of controlling an LED lighting device, the lighting device comprising an interface, the method comprising:
   receiving, via the interface, information relating to a shutter speed setting of said camera;
   determining, from said information, whether the shutter speed setting is faster than the camera's native sync speed; and
   if it is determined that the shutter speed setting is faster than the camera's native sync speed:
      determining a shutter open period for said camera, said period corresponding to the period where at least part of the camera's sensor is exposed; and
      controlling the LED lighting device to emit a continuous flash, synchronised with the determined shutter open period, such that the flash provides continuous illumination for the entire duration of the shutter open period.

2. The method of claim 1, wherein, if it is determined that the shutter speed setting is not faster than the camera's native sync speed, the method comprises controlling the LED lighting device to emit a flash only while the entire sensor of the camera is exposed.

3. The method of claim 1, wherein said determining comprises receiving, via the interface, information relating to the native synch speed of the camera and comparing it to the received information relating to a shutter speed setting of said camera.

4. The method of claim 1, wherein the brightness of the continuous flash emitted by the LED lighting device is controlled to be constant for the entire duration of the shutter open period.

5. The method of claim 1, further comprising controlling the brightness of the flash emitted by the LED lighting device in dependence on the determined shutter open period.

6. The method of claim 1, wherein said interface comprises a physical connection to said camera.

7. The method of claim 6, wherein said physical connection comprises one or more of: a wired 3.5 mm minijack connection; a wired DMX connection; a wired RS232 or USB communications interface; or a hot-shoe connection.

8. The method of claim 1, wherein said interface comprises a wireless connection to said camera.

9. The method of claim 8, wherein said wireless connection comprises one or more of: a WiFi®, Bluetooth®, Zigbee®, and/or a wireless DMX connection; or a Pocket Wizard® or Photix® remote trigger system.

10. The method of claim 1, wherein said interface comprises a user interface for receiving user input of information relating to a shutter speed setting of said camera.

11. The method of claim 1, further comprising receiving, via the interface, a flash trigger from said camera.

12. The method of claim 11, wherein the flash trigger begins said shutter open period.

13. The method of claim 11, further comprising delaying the emission of said flash following receipt of said trigger.

14. The method of claim 13, wherein the length of the delay is adjusted depending on the timing of shutter curtains of the camera.

15. The method of claim 1, wherein the LED lighting device and camera are for photography.

16. An LED lighting device comprising:
   an interface for receiving information relating to a shutter speed setting of a camera; and
   a control device configured to:
      determine, from said information, whether the shutter speed setting is faster than the camera's native sync speed; and
      if it is determined that the shutter speed setting is faster than the camera's native sync speed, the control device is further configured to:
      determine a shutter open period for said camera, said period corresponding to the period where at least part of the camera's sensor is exposed; and
      control the LED lighting device to emit a continuous flash, synchronised with the determined shutter open period, such that the flash provides continuous illumination for the entire duration of the shutter open period.

17. The LED lighting device of claim 16, wherein, if it is determined that the shutter speed setting is not faster than the camera's native sync speed, the control device is configured to control the LED lighting device to emit a flash only while the entire sensor of the camera is exposed.

18. The LED lighting device of claim 16, wherein the control device is configured to control the brightness of the continuous flash emitted by the LED lighting device to be constant for the entire duration of the shutter open period.

19. A system comprising the LED lighting device of claim 16, and a camera.

* * * * *

UNITED STATES PATENT AND TRADEMARK OFFICE
CERTIFICATE OF CORRECTION

Page 1 of 1

PATENT NO.        : 11,079,658 B2
APPLICATION NO.   : 16/813750
DATED             : August 3, 2021
INVENTOR(S)       : Roderick Allen Gammons et al.

It is certified that error appears in the above-identified patent and that said Letters Patent is hereby corrected as shown below:

On the Title Page

Item (30) Foreign Application Priority Data:
"1606658" should be changed to -- 1606658.1 --
"1705754" should be changed to -- 1705754.8 --

Signed and Sealed this
Sixteenth Day of November, 2021

Drew Hirshfeld
*Performing the Functions and Duties of the*
*Under Secretary of Commerce for Intellectual Property and*
*Director of the United States Patent and Trademark Office*